US008178643B2

(12) United States Patent
Edstrom et al.

(10) Patent No.: US 8,178,643 B2
(45) Date of Patent: May 15, 2012

(54) MOLDED POLYMERIC STRUCTURAL MEMBERS AND COMPOSITIONS AND METHODS FOR MAKING THEM

(75) Inventors: Brian D. Edstrom, Chula Vista, CA (US); Michael Charles Michie, San Diego, CA (US); Aniq Sufi, Fountain Valley, CA (US)

(73) Assignee: JELD-WEN, Inc., Klamath Falls, OR (US)

( * ) Notice: Subject to any disclaimer, the term of this patent is extended or adjusted under 35 U.S.C. 154(b) by 1143 days.

(21) Appl. No.: 11/480,115

(22) Filed: Jun. 30, 2006

(65) Prior Publication Data

US 2007/0003745 A1    Jan. 4, 2007

Related U.S. Application Data

(60) Provisional application No. 60/695,458, filed on Jun. 30, 2005.

(51) Int. Cl.
| *C08G 18/10* | (2006.01) |
| *C08G 18/32* | (2006.01) |
| *C08G 18/48* | (2006.01) |
| *C08G 18/50* | (2006.01) |
| *C08G 18/76* | (2006.01) |

(52) U.S. Cl. .......... 528/60; 49/504; 52/204.1; 52/204.2; 52/204.5; 52/204.55; 528/64; 528/65; 528/66; 528/67; 528/74.5; 528/76; 528/77; 528/78

(58) Field of Classification Search ............ 521/58, 521/174, 176; 528/85, 61, 77, 78, 60, 64, 528/65, 66, 67, 74.5, 76; 428/376; 49/504; 52/204.1, 204.2, 204.5, 204.55

See application file for complete search history.

(56) References Cited

U.S. PATENT DOCUMENTS

| 3,924,362 | A | * | 12/1975 | McAleer | 451/490 |
| 4,916,173 | A | | 4/1990 | Otloski et al. | 523/219 |
| 5,422,380 | A | | 6/1995 | Mendelsohn et al. | 521/107 |
| 5,478,494 | A | * | 12/1995 | Lee et al. | 252/182.25 |
| 5,556,934 | A | * | 9/1996 | Hagquist et al. | 528/85 |
| 5,596,021 | A | * | 1/1997 | Adembri et al. | 521/99 |
| 5,987,843 | A | | 11/1999 | Canfield | 52/656.4 |
| 6,274,639 | B1 | | 8/2001 | Foreman et al. | 521/79 |
| 6,277,943 | B1 | * | 8/2001 | Sarpeshkar et al. | 528/65 |
| 6,295,779 | B1 | | 10/2001 | Canfield | 52/656.4 |

(Continued)

FOREIGN PATENT DOCUMENTS

FR    2714069    6/1995

(Continued)

OTHER PUBLICATIONS

HiTHERM, Hot or Cold—We Got You Covered! http://www.hitherm.net/ (Aug. 2, 2004).

(Continued)

*Primary Examiner* — Rabon Sergent
(74) *Attorney, Agent, or Firm* — Stoel Rives LLP

(57) ABSTRACT

A polymer casting formulation for producing molded polymeric structural members comprises a liquid mixture that contains a polyisocyanate component comprising at least two polyisocyanates; and an isocyanate-reactive component comprising at least two isocyanate-reactive compounds, which formulation cures to form a polyurethane. Methods of using the casting formulation to produce molded polymer structural members and the structural members that are produced by such a method are also described.

30 Claims, 3 Drawing Sheets

U.S. PATENT DOCUMENTS

| | | | |
|---|---|---|---|
| 6,378,266 B1 | 4/2002 | Ellingson | 52/656.4 |
| 6,393,779 B1 | 5/2002 | Boldt | 52/210 |
| 6,412,227 B1 | 7/2002 | De Zen | 49/504 |
| 6,531,010 B2 | 3/2003 | Puppin | 156/88 |
| 6,541,534 B2 | 4/2003 | Allen et al. | 521/174 |
| 6,604,334 B2 | 8/2003 | Rochman | 52/717.01 |
| 6,680,090 B2 | 1/2004 | Godavarti et al. | 428/34 |
| 6,884,852 B1 | 4/2005 | Klauck et al. | 525/458 |

FOREIGN PATENT DOCUMENTS

WO    WO 02/102887 A1    12/2002

OTHER PUBLICATIONS

Types of Stereoisomerism in Polymers, Chapter 8, Stereochemistry of Polymerization, pp. 604-681.

* cited by examiner

MOLDED POLYMERIC STRUCTURAL MEMBERS AND COMPOSITIONS AND METHODS FOR MAKING THEM

CROSS-REFERENCE TO RELATED PATENTS AND PATENT APPLICATIONS

This application is a non-provisional of and claims priority to U.S. Provisional Patent Application No. 60/695,458, filed Jun. 30, 2005, which is incorporated by reference herein in its entirety.

BACKGROUND OF THE INVENTION (1) Field of the Invention

The present invention relates to molded polymeric structural members and compositions and methods for making them.

(2) Description of the Related Art

Wooden building structures, such as door frames and window frames, may be prone to deteriorate when exposed to environmental weathering. For example, once water contacts a wooden door frame, it can wick along the wood to be absorbed throughout the frame. To counteract such weathering, it is desirable to construct door frames of clear lumber that is moisture-resistant, free of knots, and capable of being stained and/or painted to give high quality results. Unfortunately, such high quality lumber has become more difficult to obtain and costly.

Further, there can be significant waste involved in manufacturing wooden door frames and window frames. Typically, frames for windows and doors are made of separate parts that are then assembled to form the frame. For example, door frames generally include two vertically spaced jambs that define the sides of the frame, and a header (or head jamb) that defines the top of the frame. In some cases, the frame also includes a threshold or sill that defines the bottom of the frame. To manufacture a door frame, a tree must be debarked, the limbs removed, and the truck cut into elongate strips of lumber. Next, knots and other irregularities are removed and the remaining pieces of wood are finger-jointed together. At this point, the lumber is typically an elongate strip that is essentially free of knots and other irregularities. The lumber is then molded and shaped to the final configuration required, and the jamb assembled. After priming, weather stripping may be secured to the jambs, and the frame, including two side jambs, a header jamb and optionally, a bottom sill, is assembled. Even with highly efficient manufacturing protocols, the process may result in large amounts of the original wood being wasted or relegated for other manufacturing purposes.

Also, as window and door frames are exposed, there is a tendency for the frame to be bumped by objects being transported through the window or doorway. Thus, the frame should be resistant to scratching or chipping upon impact. While frames made of high quality lumber are aesthetically pleasing, real wood may not be particularly resistant to physical impact.

Some attempts to reduce reliance on wooden door and window frames have included the use of plastic or vinyl clad wooden frame members (see, e.g., U.S. Pat. Nos. 5,987,843, 6,295,779, and 6,378,266). Still, these types of frames may be less aesthetically pleasing to many consumers and may require time-consuming manufacturing steps such as milling the wooden jambs, extruding the vinyl cladding to the appropriate shape, and fitting the cladding on the jamb. Alternatively, door frames that are entirely synthetic have been developed. Plastic frame members are attractive from a manufacturing standpoint in that they can be molded to provide a desired shape, and can accommodate attachment fixtures without the use of nails, screws or other types of fasteners (see e.g., U.S. Pat. No. 6,393,779). In some cases, however, plastic door jambs do not provide the support required to hold a door, and can buckle under extreme temperature conditions. To provide increased strength, the polymers used for the frame part may be combined with wood fiber, glass fiber, or other types of reinforcing material (see e.g., U.S. Pat. Nos. 6,412,227, 6,531,010, and 6,680,090). Alternatively, larger reinforcing members may be placed at strategic points within the frame part to stabilize the frame member and allow for attachment of other parts (see e.g., U.S. Pat. No. 6,453,631).

Metal door frames, or door frames having metal cladding, have been developed (see e.g., U.S. Pat. No. 6,604,334). Still, metal cladding may not be as aesthetically pleasing to some consumers. Also, metal frames typically suffer from substantial energy loss upon exposure to very hot or cold temperatures, and can suffer from environmentally induced weathering such as rust and photochemical deterioration.

Thus, there is a need to manufacture building parts, such as window frames and door frames, that have increased strength and that do not require the use of expensive, high quality lumber. There is also a need to develop door frames and window frames that are as aesthetically pleasing as wooden frames to the discerning consumer.

SUMMARY OF THE INVENTION

Figure 1:
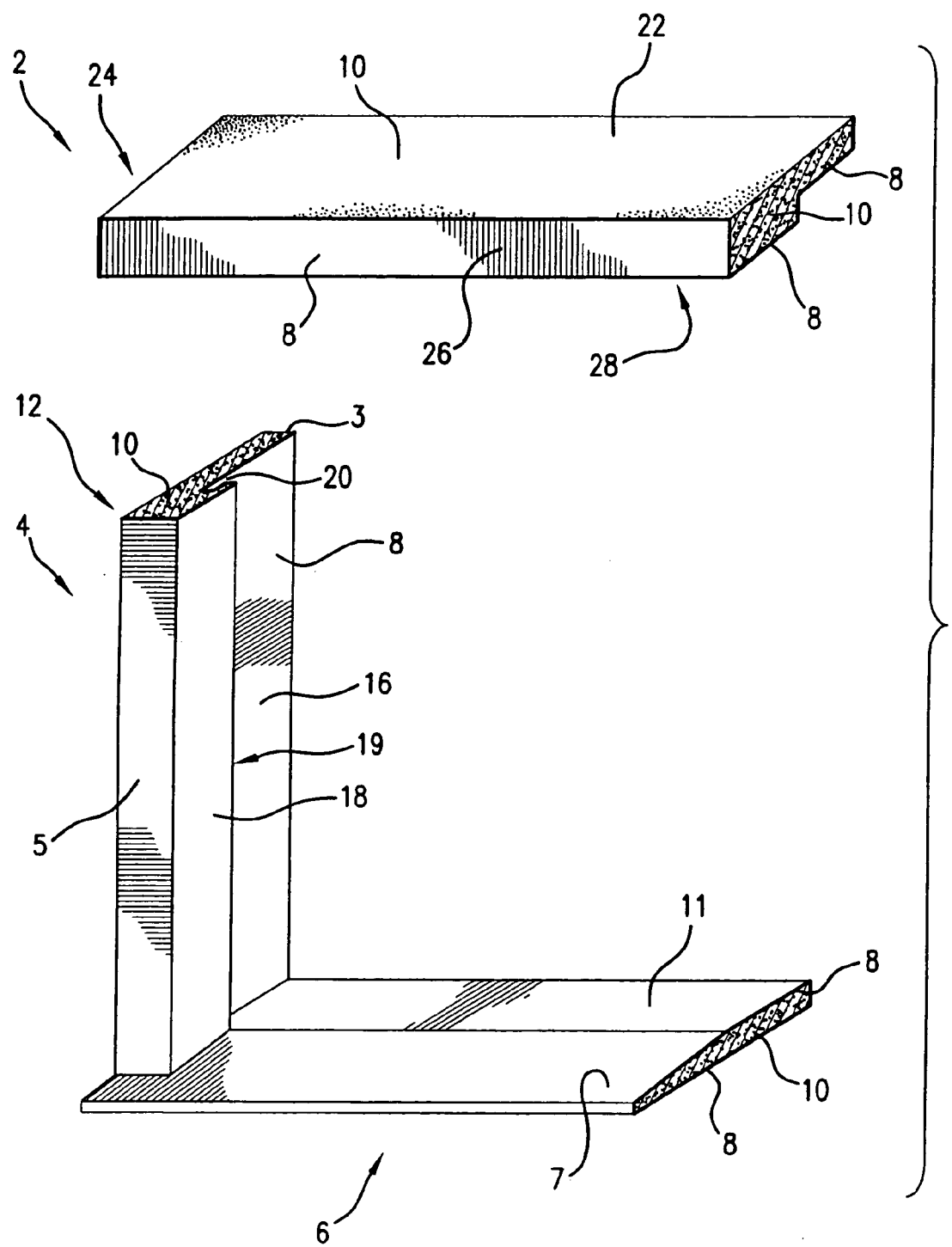
FIG. 1 illustrates an exploded view of partial door frame, showing partial cross-sections of a side door jamb, a header door jamb, and a bottom sill, in accordance with an example embodiment of the present invention.

Briefly, therefore, the present invention is directed to a novel polymer casting formulation for producing molded polymeric structural members comprising a liquid mixture that contains: a polyisocyanate component comprising at least two polyisocyanates; and an isocyanate-reactive component comprising at least two isocyanate-reactive compounds, which cures to form a polyurethane.

The present invention is also directed to a novel kit for the production of a polymer casting formulation for producing molded polymeric structural members, the kit comprising: a polyisocyanate component that contains at least two polyisocyanates; and an isocyanate-reactive component that contains at least two isocyanate-reactive compounds, wherein, mixing of the polyisocyanate component with the isocyanate-reactive component results in the production of a polyurethane.

The present invention is also directed to a novel method of producing a molded polymeric structural member comprising intermixing a polyisocyanate component comprising at least two polyisocyanates with an isocyanate-reactive component comprising at least two isocyanate-reactive compounds to form a liquid casting formulation; introducing the liquid casting formulation into a mold having a negative form of the structural member; allowing the polyisocyanate to react with the isocyanate-reactive compound to form a solid polyurethane polymer in the shape of the structural member; and removing the structural member from the mold.

The present invention is also directed to a novel molded polymeric structural member comprising a molded article having a surface region and a core region and lacking a distinct boundary therebetween, wherein the surface region has a durometer hardness ranging from about 58 to 70 and the core region has a durometer hardness ranging from about 72 to 86.

Among the several advantages found to be achieved by the present invention, therefore, may be noted the provision of structural members that can serve as building parts, such as window frames and door frames, that have increased strength and that do not require the use of expensive, high quality lumber, and also the provision of structural members that can serve as door frames and window frames that are as aesthetically pleasing as wooden frames to the discerning consumer.

DETAILED DESCRIPTION OF THE PREFERRED EMBODIMENT

In accordance with the present invention, it has been discovered that polymeric structural members having superior characteristics can be made by polymerizing a particular blend of reactants in a mold to form a cured structure. Methods of making such structures economically and accurately have also been discovered. The molded structures may be formulated in such a manner as to provide a flexible, impact resistant outer layer and a harder and more rigid inner core. As an example, a blend of several different polyisocyanates when reacted with a blend of several different isocyanate-reactive compounds forms a superior polymeric door or window frame member when cured.

Embodiments of the present invention comprise molded polymer structural members for use in building structures and methods for making such structural members. In one embodiment, the present invention comprises a polymeric structural member comprising a durable and flexible surface region and a core region having less flexibility and higher rigidity than the surface region. The more flexible surface region may display memory such that upon being changed in shape or deformed, the material in the surface region substantially regains the shape held prior to deformation. The core region, on the other hand, provides strength and rigidity necessary to maintain the shape and structural integrity of the member. An advantage of this property of the novel structural member is that if the surface of the structure is changed in shape in any manner, as for example by being nicked or scratched, it will eventually regain the shape held prior to being deformed. Also, when a nail or other fastener is driven through the outer shell, the polymer may close around the nail, thus enhancing setting of the fastener in the shell.

As will be discussed in detail below, the polymer that is used to form the present structural member can be an unfilled elastomer, a filled elastomer, a foam, or it can be a syntactic blend such as a syntactic foam.

Another embodiment of the present invention comprises a method for manufacturing a polymeric structural member comprising blending at least two polyisocyanates with at least two isocyanate-reactive compounds and polymerizing the reactants in a mold under conditions such that the blend polymerizes to provide a structural member having a surface region and a core region and where the surface region and the core region have different properties.

Without being bound by this or any other theory, the inventors believe that the difference in properties between the surface region and the core region of the cured structural member is due to the use of a mold in the production of the novel member, where the polymerization reaction at or near the interface with the mold surface takes place at a lower temperature and thus polymerizes under different conditions than the reaction taking place in the core region of the mold contents. Evidence of this difference is shown in cross-sections of cured structural members where the surface region and the core region differ in color as well as in physical properties. In one embodiment, the polymer formed at or near the mold surface has a structural memory and a higher level of flexibility than the polymer found in the core region of the member.

Various embodiments of the present invention may provide certain advantages. The polymeric structural members of the present invention may provide substantial resistance to weathering and physical deformation so as to be suitable for use in building structures. For example, door frames of the present invention may provide increased resistance to impact and to moisture-induced shrinking or swelling as compared to wood-based frames.

Also, the structural members of the present invention may reduce the need for replacement and repair of building structures. For example, the structural members may be formulated to include a surface region that can function as a protective shell such that when the surface of the composite is scratched or nicked, it can regain its original shape and thus appear unmarked.

The manufacture of the structural members of the present invention may be much simpler than the manufacture of similar parts from wood. Thus, rather than using a multi-step process of cutting, milling, and shaping lumber as may be required to make wooden frame parts, the structural members of the present invention may be made by the one-step process of pouring components into a mold and allowing the components to polymerize.

The present invention may be embodied in a variety of ways. In one embodiment, the present invention comprises a polymeric structural member formed by the polymerization of a polyisocyanate and two or more isocyanate-reactive compounds, or the polymerization of at least two polyisocyanate compounds with an isocyanate-reactive compound, or the polymerization of at least two polyisocyanates and at least two isocyanate-reactive compounds, as will be discussed in detail below, in a mold to form a member having a surface region having a measurable flexibility, and a supportive core region having less flexibility than the surface region. The more flexible surface region may display memory such that upon being changed in shape or deformed, it substantially regains the shape held prior to deformation.

Embodiments of the present invention also comprise methods of making polymeric structural members. In one embodiment, the method comprises blending at least two polyisocyanates and polymerizing the polyisocyanates with at least two isocyanate-reactive compounds under conditions such that a portion of the blend at or near the inner surface of the mold polymerizes under different thermal conditions than the portion of the blend that is not at or near the surface of the mold. The mold may be fashioned to have an inner surface shaped to form the outer surface of the structural member. By way of example, the inner surface of the mold can have a simulated wood grain pattern, which is transferred to the outer surface of the molded structural member.

Structural members having a variety of shapes can be made by the present method. For example, the structural member may comprise a door frame member, such as a vertical door jamb, a header jamb, or a door sill. In one embodiment, the jambs may be flat. Alternatively, the jambs may be rebated. In another embodiment, the structural member may be a window frame member. In other embodiments, the structural member may comprise lineal moldings such as casing and brickmold profiles, mull posts, door stops, plinth blocks, or astragals.

FIG. 1 provides an example of an embodiment of a polymeric structural member of the present invention as embodied in a door frame. As shown in FIG. 1, a door frame may comprise a header jamb 2 that defines the upper part of the door opening, a left doorjamb 4 and right door jamb (not shown) that frame the sides of the door, and a sill 6 as the bottom of the frame. Each door frame section in FIG. 1 is shown as a partial cross section showing surface region 8 and core region 10. The sill 6 may further comprise an outer portion 7 that is slanted to facilitate run-off of water away from the door, and a substantially flat inner portion 11 that provides a base for the door frame. Not shown in FIG. 1 is the door which, in the view shown, would hang from the right jamb and swing away from the viewer. Thus, as depicted in FIG. 1, side 5 of door jamb 4 may comprise a surface facing the outside of the building (or doorway) and opposite side 3 of door jamb 4 may comprise a surface facing the inside of the building (or doorway). In this orientation, surfaces 16 and 18 of door jamb 4 comprise the side of the jamb that makes up the door opening, and surface 12 is the side of the jamb that is adjacent to the building structure.

As used herein, the terms "surface region" mean that part of a molded structure that is adjacent to and includes the surface of the structure that is in contact with the mold during curing. In one embodiment, the surface region comprises the surface that interfaces with the mold and that part of the structure that is within about 1 mm of the mold interface surface, or that is within about 2 mm of the mold interface surface, or that is within about 3 mm of the mold interface surface, or that is within about 5 mm of the mold interface surface, or that is within about 12 mm of the mold interface surface. As used herein, the terms "core region" mean that part of a molded composite structure that is other than the surface region. Namely, that part of the structure that is at the core of the structure and not at or near the mold interface surface during curing. As that term is used herein, "curing" includes the polymerization of the reactants used to fill the mold and changing of the mold contents from a liquid to a solid.

It can be seen that the side of jamb 4 that makes up the doorway may comprise two distinct surfaces, 16 and 18, such that the jamb may be thicker in the part of the jamb that is on the exterior of the door when the door is closed, and thinner in the part of the jamb that is on the interior side of the jamb. Surface 19 may provide a stop against which a door, when seated in the frame and closed, will rest. In some cases, a molding or weather stripping may be inserted in groove 20, adjacent to face 19, to provide a cushion and insulating surface for the closed door. Similarly, header jamb 2 may comprise surfaces, 22 and 24, that are adjacent to the building, and surfaces, 26 and 28, that comprise the surface of the frame opening and thus, comprise exterior surfaces of the header jamb.

As shown in FIG. 1, the frame members of the present invention may comprise a surface region 8 (or shell) having a modulus of elasticity, and a core region 10 having a modulus of elasticity that is lower than the modulus of elasticity of the surface region 8. Accordingly, in one embodiment, the surface region 8 is more flexible than the core region 10. By way of example, the surface region can have a defined modulus of elasticity. In one embodiment, the surface region has a modulus of elasticity (MOE) ranging from about 150,000 pounds per square inch (psi)(10,549 kg/cm$^2$) to about 900,000 psi (63,291 kg/cm$^2$). In another embodiment, the modulus of elasticity (MOE) for the surface region may range from about 200,000 psi (14,065 kg/cm$^2$) to about 500,000 psi (35,162 kg/cm$^2$).

To function as building structures, the structural members of the present invention should be able to withstand a substantial bearing load. Thus, in one embodiment, the member can have a modulus of rupture (MOR) of about 5,000 psi (351 kg/cm$^2$) to about 15,000 psi (1,055 kg/cm$^2$).

Also, the polymer in the surface region 8 can display memory such that upon deformation, the surface region substantially regains the shape held prior to deformation. The surface region of the present structural member has a measurable hardness, as measured, for example by durometer reading. In one embodiment, for example, the surface region has a durometer hardness ranging from about 58 to 70, or from about 62 to 66. The core region of the structural member may have a hardness that is higher than that of the surface region. For example, the core region may have a durometer hardness ranging from about 72 to 86, or from about 75 to 80. In one example embodiment of a doorjamb, the surface region may comprise a durometer hardness of about 64 and the core region may comprise a durometer hardness of about 76-79.

The structure may be formed such that the surface region includes the exterior facing surface of the frame member. In this way, when the frame is assembled, the door opening has the surface region as the exterior surface of the vertical jambs and the header jambs. In an embodiment, sill 6 also comprises a surface region that surrounds a core region. In one embodiment, the surface of the composite structure that is immediately adjacent to the building (e.g., surfaces 12 and 22) may be include a surface region 8 of the structure. Alternatively, as depicted in FIG. 1, the surface that is immediately adjacent to the building and/or other jamb parts (i.e., the unexposed surface) can be the core region 10. This surface may be further machined as necessary prior to installation of the composite structure in the building.

By way of explanation, in an open mold, surface regions 8 are formed only at the interfaces of the mold and the mold contents, while the mold contents at the open surface of the mold cure with properties of the core region 10. Thus, one can select the properties of certain surfaces of a structural member by designing the mold to contact the mold contents only at surfaces for which properties of the surface region 8 are desired. This can also be accomplished by machining a structural member after curing to expose material having properties of the core region 10 wherever desired.

Figure 2:
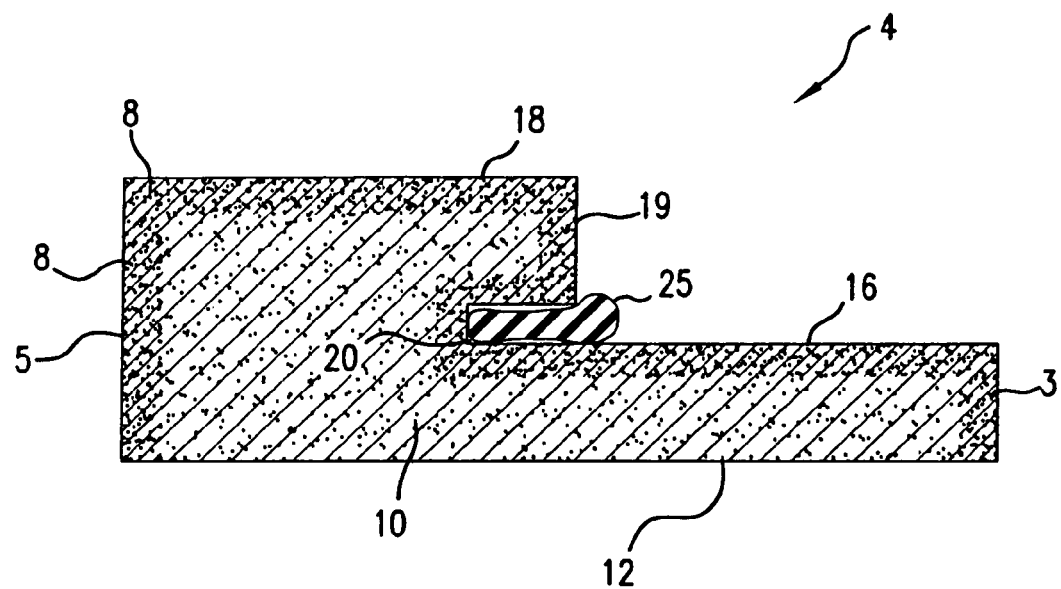
FIG. 2 illustrates a cross-sectional view of a door jamb in accordance with an example embodiment of the present invention.

FIG. 2 shows a cross-sectional view of a side doorjamb 4 in accordance with an embodiment of the present invention, where side 5 is the surface that faces the outside of the doorway or building, surfaces 16 and 18 comprise the surfaces in the doorway opening, surface 3 faces the interior of the doorway, and surface 12 is the side of the jamb that is attached to the building structure. Also shown in FIG. 2 is molding or weather stripping 25 that may be used to cushion the door so that when the door is closed it maintains a tight seal. As shown in FIG. 2, side jamb 4 may comprise a surface region that surrounds a core region. Thus, the surface region or shell is exposed to the exterior side of the doorway as surface 5, the interior side of the doorway as surface 3, and the doorway itself, as surfaces 16, 18 and 19. Conversely, in one embodiment, the surface of the structure that is not exposed, but that will be immediately adjacent to the building 12, may comprise the core region 10. Alternatively, the structure may be formed with a closed mold such that the surface region 8 comprises each and every surface layer of the structure.

Figure 3:
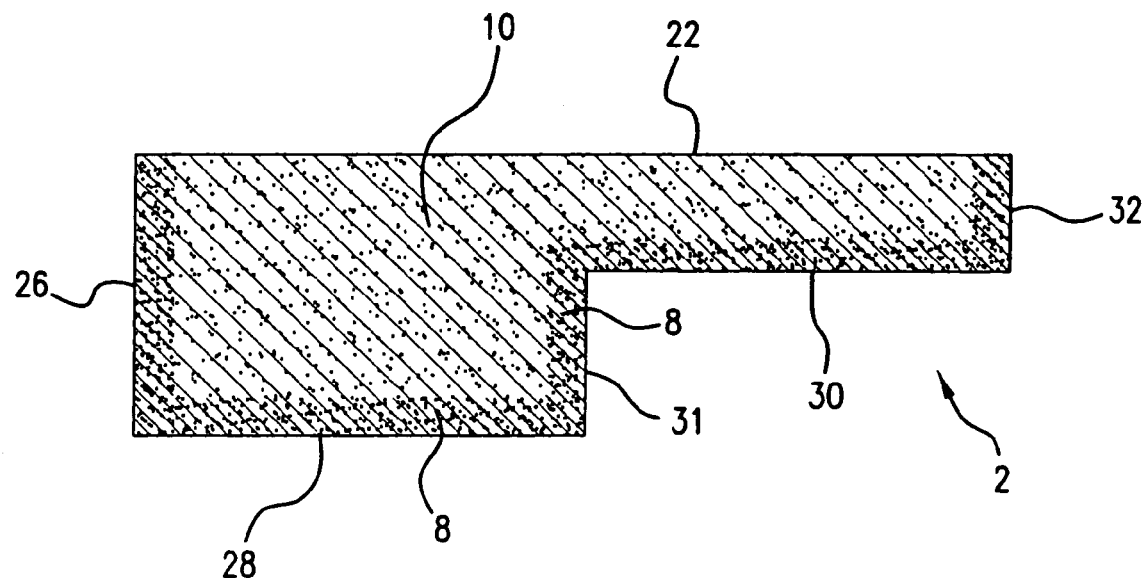
FIG. 3 illustrates a cross-sectional view of a header jamb in accordance with an example embodiment of the present invention.

FIG. 3 shows a cross-sectional view of header jamb 2 also in accordance with an example embodiment of the present invention, having exterior facing side 26, surfaces 28 and 30 that comprise the doorway opening, an interior facing side 32. Also shown is surface 31 against which a door, when seated in the frame and closed, may rest, and side 22 which may be attached to the building structure. As shown in FIG. 3, header jamb 2 may also comprise a surface region that is exposed to the exterior and that encloses a core region. In an alternate embodiment, the surface region 8 may also comprise the surface 22 immediately adjacent to the building.

As schematically illustrated in FIGS. 2 and 3, in one embodiment of the present invention, the surface region may comprise a relatively thin layer on the surface of the structural member. In this way, the surface region may function, at least in part, as a shell that surrounds a core region. The core region can provide strength and support for the structural member. The transition between the surface region and the core region may be gradual enough such that there is no clear structural demarcation between the two regions. In one embodiment, the surface region may comprise about 1 to 20 percent of the total volume of the overall structure. In another embodiment, the surface region may comprise from about 2 to 10 percent of the overall structure.

A variety of polymers and polymer blends may be used to make the composite structures of the present invention. In one embodiment, the polymer or polymer blend may comprise a syntactic polymer or a blend of syntactic polymers. For example, a syntactic polyurethane, or a blend of two syntactic polyurethanes may be used. Alternatively, other syntactic polymers such as syntactic epoxy polymers may be used.

In one embodiment, the present polymeric structural members can be produced by intermixing a polyisocyanate component with an isocyanate-reactive component to form a polymer casting formulation. The polyisocyanate component comprises at least one polyisocyanate and the isocyanate-reactive component comprises at least one isocyanate-reactive compound. Either of the components can contain other materials in addition to the reactive species. Reaction between the components produces a polyurethane. In another embodiment, the polyisocyanate component comprises at least two different polyisocyanates, which can be reacted with an isocyanate-reactive component that comprises at least two different isocyanate-reactive compounds to form a polyurethane. When two or more isocyanate-reactive compounds are used, it is preferred that each of the isocyanate-reactive compounds is polyfunctional in the sense that each molecule of the compound has at least two groups that can react with an isocyanate.

Polyisocyanates suitable for use in the present invention may comprise (cyclo)aliphatic and/or, in particular, aromatic polyisocyanates which are standard in the art. Generally, aromatic isocyanate groups are considerably more reactive with both hydroxyl and amine groups than are aliphatic isocyanate groups. Aromatic polyisocyanates will generally react to form a solid polymer more rapidly than will aliphatic polyisocyanates. In one embodiment, a catalyst may be used to facilitate polymerization with aliphatic polyisocyanates. Thus, suitable isocyanates for preparing the composites of the present invention may comprise aromatic diisocyanates, such as, but not limited to, diphenylmethane diisocyanate (MDI) and toluene diisocyanate (TDI).

An embodiment of the present invention comprises using an aromatic diisocyantate to prepare the polyurethanes of the present invention. Aromatic diisocyanates suitable for preparation of polyurethane may contain about 6 to about 25 carbon atoms (not including the isocyanate group) and include, but are not limited to, the positional isomers of toluene diisocyanate (TDI), including toluene-2,4-diisocyanate, toluene-2,6-diisocyanate, the meta and para isomers of α, ,α, α, α-tetramethyl-xylene diisocyanate (TMXDI), the meta and para isomers of phenylene diisocyanates, including 4,4'-methylene-bis(phenylisocyanate), also known as diphenylmethane-4,4'-diisocyanate (4,4'-MDI or as MDI), diphenylmethane-2,4-diisocyanate (2,4'-MDI), naphthalene-1,5-diisocyanate (NDI), positional isomers of diethylbenzene diisocyanates, as well as blends thereof (e.g., U.S. Pat. No. 5,422,380).

In another embodiment, aliphatic diisocyantes may be used to prepare the polyurethanes of the present invention. Aliphatic diisocyanates suitable for preparation of polyurethane may contain from 2 to about 36 carbon atoms (not including the carbon in the isocyanate group), and include cyclic and non-cyclic aliphatic groups. Thus, representatives difunctional aliphatic polyisocyanates may include, but are not limited to, ethylene diisocyanate, tetramethylene diisocyanate, isomers of cyclohexane diisocyanate including trans-cyclohexane-1,4-diisocyanate (CHDI), 4,4'-methylene-bis(cyclohexylisocyanate)(hydrogenated MDI), dodecamethylene diisocyanate, hexamethylene diisocyanate (HDI), dimeryl diissocyanate (DDI), isophorone diisocyanate (IPDI), 2,2,4-trimethylhexamethylene-1,6-diisocyanate, meta and para isomers of tetramethylxylene diisocyanate (also known as benzene,1,3-bis(1-isocyanato-1-methylethyl)- or benzene, 1,4-bis(1-isocyanate-1-methylethyl), and blends thereof.

Also, polyisocyanates containing more than two isocyanate groups, such as triphenylmethane-4,4',4"-triisocyanate, polymethylene polyphenylene polyisocyanates, and blends thereof, may be used for the production of the syntactic polyurethane polymers of the present invention. A commercially available polyisocyanate with a functionality between two and three consists of a trifunctional cycloadduct of 4,4'-MDI in equilibrium with the difunctional carbodiimide of 4,4'-MDI and unconverted 4,4'-MDI (Isonate® 143L; Dow Chemical Company). Suitable polymeric polyisocyanates also include Rubinate® MDI and MDI/TDI blends from Huntsman Corporation, including Rubinate® M and Rubinate® 1820.

In an embodiment of the present formulation in which two different polyisocyanates are used, the polyisocyanates can comprise two or more compounds selected from the group consisting of aromatic diisocyanates, aliphatic diisocyanates, polymeric isocyanates, and mixtures thereof. It is preferred that the two polyisocyanates comprise two different alkylene-diaryldiisocyanates. It is more preferred that the two polyisocyanates comprise two different polymeric alkylenediphenyi-diisocyanates, and two different polymeric isocyanates both of which comprise polymeric methylenediphenyidiisocyanate (MDI), have been found to be suitable. In particular, both polymeric methylenediphenyldiisocyanates can be copolymers of 2,4-MDI and 4,4-MDI, and in an embodiment, one polymeric methylenediphenyldiisocyanate (such as for example, Rubinate® M, available from Huntsman Corp., The Woodlands, Tex.) contains a higher ratio of 4,4-MDI-to-2,4-MDI than the other. In this embodiment, the polymeric methylenediphenyldiisocyanate having a higher ratio of 4,4-MDI-to-2,4-MDI can have a functionality of about 2.8 and the polymeric methylenediphenyldiisocyanate having a lower ratio of 4,4-MDI-to-2,4-MDI (such as for example Rubinate® 1820, available from Huntsman Corp., The Woodlands, Tex.) can have a functionality of about 2.5. It is preferred that the ratio by weight of the polyisocyanate having a higher ratio of 4,4-MDI-to-2,4-MDI to the polyisocyanate having a lower ratio of 4,4-MDI-to-2,4-MDI is between about 90:10 to about 10:90, more preferably between about 50:50 and about 70:30, and yet more preferred that the ratio by weight of the polyisocyanate having a higher ratio of 4,4-MDI-to-2,4-MDI to the polyisocyanate having a lower ratio of 4,4-MDI-to-2,4-MDI is about 60:40.

In some instances it is useful if the polyisocyanate component comprises in addition a polymeric pre-polymer mixing agent. An example of such an agent is an isocyanate prepolymer of a polymeric isocyanate and an alkoxylated propylene glycol, such as PP205, available from HiTherm LLC, Ceritos, Calif.

In a certain embodiment, the polyisocyanate component of the polymer casting formulation can comprise two different polymeric methylenediphenyldiisocyanates which are copolymers of 2,4-MDI and 4,4-MDI, wherein the polyisocyanate component comprises between about 45% to about 65% of the polymeric methylenediphenyldiisocyanate having a higher ratio of 4,4-MDI-to-2,4-MDI and a functionality of about 2.8, and between about 20% to about 40% of the polymeric methylenediphenyldiisocyanate having a lower ratio of 4,4-MDI-to-2,4-MDI and a functionality of about 2.5, and with the balance being a polymeric pre-polymer mixing agent.

Suitable isocyanate-reactive compounds may comprise molecules having two or more hydroxyl groups, which can be primary or secondary or of the phenolic type, or two or more primary or secondary amino (or amine) groups. The amino groups may be of an aliphatic or aromatic type. Polyfunctional isocyanate-reactive compounds may also utilize molecules which contain both amino and hydroxyl groups. In cases where no compound having a functionality greater than two is employed, an excess of diisocyanate can provide a three dimensional network through allophanate and/or biuret crosslinks.

Isocyanate-reactive compounds suitable for use in the present method include compounds that comprise two or more reactive groups selected from OH, SH, NH, $NH_2$ and CH-acidic groups, such as β-diketo groups. Examples of compounds that may be used as the isocyanate-reactive compound of the present invention include polyether-polyamines, and/or preferably polyols such as polyether polyols, polyester polyols, polythioether polyols, polyesteramides, hydroxyl-containing polyacetals, hydroxyl-containing aliphatic polycarbonates, or mixtures of at least two of these polyols. In general, suitable polyols may include compounds nominally having from 2 to about 8 isocyanate-reactive hydroxyl groups per molecule. The hydroxyl equivalent weight of the individual polyols may range from about 31 to about 2000 or more. Additionally, the isocyanate-reactive compounds may be used as a mixture with customary chain extenders and/or crosslinking agents.

Polyols that may be used for the present invention include compounds such as alkylene glycols (e.g., ethylene glycol, propylene glycol, 1,4-butane diol, 1,6 hexanediol and the like), glycol ethers and polyethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like.

Non-cyclic aliphatic diactive species having two hydroxyl groups may also be used for the preparation of polyurethane. Such non-cyclic aliphatic diactive species may include, but are not limited to, compounds such as ethylene glycol, 1,2-butanediol, 1,3-butanediol, 1,4-butanediol, 2,3-butanediol, 2-methyl-1,3-propanediol, 2,2-dimethyl-1,3-propanediol, 2,2-dimethyl-1,4-propanediol, 1,2-pentanediol, 1,4-pentanediol, 1,5-pentanediol, 2,3-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, hexylene glycol, pinacol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, octamethylene glycol, 2,2,4-trimethyl-1,3-pentanediol, 2-butyl-2-ethyl-1,3-propanediol, 1,9-nonanediol, 1,2-decanediol, 1,10-decanediol, 1,2-dodecanediol, 1,12-dodecanediol, 1,2-tetradecanediol, 1,14-tetradecanediol, 1,2-hexadecanediol, 1,16-hexadecanediol, and mixtures thereof.

Also, polyether polyols that may be used to form polyurethane structural members of the present invention. Among the suitable polyether polyols that may be used are polymers of alkylene oxides such as ethylene oxide, propylene oxide and 1,20-butylene oxide or mixtures of such alkylene oxides. Such polyether polyols have a hydroxyl equivalent weight of from about 200 to about 2000 or more. For example, in an embodiment, polyethers such as polypropylene oxides or polymers of a mixture of propylene oxide and a small amount ethylene oxide may be used. Also, ether-diols such as diols prepared by the ring opening polymerization of alkylene oxides by reaction with a dihydric compound may be used.

Polyester polyols may also be suitable for the preparation of polyurethane for the present structural members. Suitable polyester polyols may include reaction products of polyols or diols, with polycarboxylic acids or their anhydrides, such as dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may also be unsaturated. Examples of polycarboxylic acids that may be used include succinic acid, adipic acid, terephtahalic acid, isophthalic acid, trimellitic amhydride, phthalic anhydride, maleic acid, maleic acid anhydride and fumaric acid. The polyols may have an equivalent weight of about 150 or less, and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. In one embodiment, aromatic polyester polyols based on compounds such as, but not limited to, orthophthalic acid, orthophthalic anhydride, dimethylterephehalate, polyethyleneterephehalate, and a glycol or glycol ether such as ethylene glycol or diethylene glycol, may be preferred because they can provide good rigidity to the polymer. Also, a tri- or higher functional polyol may be used as a crosslinker such as glycerine or trimethylolpropane with the polyester polyols.

An embodiment of the present invention may also comprise using monocyclic and polycyclic aliphatic diactive compounds having two hydroxyl groups as the isocyanate-reactive compound. Such di-hydroxyl compounds include, but are not limited to, cis- and trans isomers of cyclopentanediol, cyclohexanediol, cyclohexanedimethanol, cyclooctanediol, and mixtures thereof. Also, representative polycyclic aliphatic diactive compounds having two hydroxyl groups may include positional isomers of decalindiol and mixtures thereof. Representative aliphatic diols which contain an aromatic ring to which hydroxyalkyl groups are attached include 2,2'-(m-phenylenedioxy)diethanol (also known as resorcinol di(β-hydroxyethyl)ether or HER), 2,2'-(p-phenylenedioxy)diethanol (also known as hydroquinone di(β-hydroxyethyl)ether or HQEE) and phenyl diisopropanol amine.

Also, polyactive species, such as compounds having more than two hydroxyl groups, may be used to form the polyurethane. In one embodiment, suitable noncyclic aliphatic polyactive compounds having more than two hydroxyl groups include, but are not limited to, glycerol, 1,1,1-tris(hydroxymethyl)ethane, 2-ethyl-2-(hydroxymethyl)-1,3-propanediol, (also known as trimethylol propane or TMP), pentaerythritol, dipentaerylthritol, N,N,N',N'-tetrakis(2-hydroxypropyl)ethylene diamine (also known as Quadrol) and mixture thereof.

Compounds comprising diamines may also be used for preparation of the present polyurethane. Suitable diamines may have aliphatic or aromatic substitution, and have from 2 to 600 carbon atoms. Suitable diamines may be primary or secondary, where a primary amine has a single organic radical bonded to the nitrogen of —NH2, and a secondary amine has two organic radicals, which may be the same or different from one another, bonded to the nitrogen of —NH. In an embodiment, amines having greater than 600 MW may be used with aromatic isocyanates due to the high reactivity of the aromatic isocyanates. Representative diamines having aliphatic substitution may include, but are not limited to, ethylene diamine, 1,2-diaminopropane, 1,3-diaminopropane, 1,4-diaminobutane, 1,2-diamino-2-methylpropane, 1,5-diaminopentane, 2,2-dimethyl-1,3-propanediamine, 1,3-diaminopentane, 1,6-hexanediamine, 2-methyl-1,5-pentanediamine, 1,2-diaminocyclohexane, 1,4-diaminocyclohexane, 1,7-diaminoheptane, 1,8-iaminooctane, 2,5-dimethyl-2,5-hexanediamine, 1,9-diaminononae, 1,10-diaminodecane, 1,8-diamino-paramethane, isophoronediamine, 1,12-diaminododecane, and mixtures thereof. Also, representative aromatic diamines include metaxylylenediamine, para-xylylenediamine, 1,8-diaminonaphthalene, 1,5-diaminonaphthalene, dimethyltoluenediamine (DMTDA), diethyltoluenediamine (DETDA), and other positional diaminonaphthaline isomers, 2,4-diaminomesitylene, and mixtures thereof.

Also, aliphatic and aromatic polyamines comprising more than two amine groups may be used for preparation of the present polyurethane. Examples of aliphatic polyamines that may be used to make the polyurethanes of the present invention are diethylenetriamine, triethylenetriamine, triethylene tetraamine, tetraethylene petamine and bishexamethylenetriamine, and aromatic triamines such as mononuclear 1,3,5-triaminobenzene, the trinuclear compound dodecahydro-1,4,7,9-b-tetrazaphenalene, and the tetramine diphenylsulfone derivative, bis(3,4-diaminophenyl) sulfone.

Embodiments of the present invention also comprise the use of polyfunctional species for formation of the polyurethane. In one embodiment, diactive species comprising amine and hydroxyl groups may be used. Suitable aminoalcohols may comprise aliphatic or aromatic carbon moieties, and have from 2 to about 200 carbon atoms. Representative diactive aminoalcohols may include ethanolamine, 1-amino-2-propanol, 2-amino-1-propanol, 3-amino-1-propanol, 2-(methylamino)ethanol, 2-amino-1-butanol, 4-amino-1-butanol, 2-amino-2-methyl-1-propanol, 2-(ethylamino)ethanol, 5-amino-1-pentaol, 2(propylamino)ethanol, 2-amino-1-hexanol, 6-amino-1-hexanol, 2-(tert-butylamino)ethanol, N-hydroxyethyldiethylenetriamine, N,N'-bis(hydroxyethyl)diethylenetriamine, N-(2-hydroxypropyl)ethylenediamine, diethanolamine, and mixtures thereof. In one embodiment, at least a small amount of a tertiary amine-containing polyol may be incorporated in the isocyanate-reactive component. The presence of this tertiary amine-containing polyol can increase the reactivity of the isocyanate-reactive component during the early stages of its reaction with the polyisocyanate so that the reaction builds viscosity more quickly. Such tertiary amine-containing polyols include, for example, triisopropanol amine, triethanolamine and ethylene, and/or propylene oxide adducts of ethylene diamine.

When at least two different polyisocyanates are used, it is preferred that each of the two different polyisocyanates has a functionality of between 2 and 8, more preferably between about 2 and 5, and yet more preferably between about 2 and 3. In one embodiment, synthesis of polyurethane is facilitated by the use of isocyanate-reactive compounds that have an average nominal functionality of from about 2.2 to about 8, or from about 2.5 to about 5.0, or from about 2.5 to about 4.0 isocyanate-reactive hydroxyl groups per molecule. In addition, the equivalent weight (weight per equivalent of isocyanate-reactive groups) of the fully formulated isocyanate-reactive component may be from about 100 to about 300, preferably from about 150 to about 250.

In one embodiment, the two isocyanate-reactive compounds of the isocyanate-reactive component can comprise at least one alkoxylated glycerol, at least one alkoxylated triethanolamine, and at least one alkoxylated ethylenediamine. A preferred embodiment is where the two isocyanate-reactive compounds comprise at least two different alkoxylated glycerols, at least one alkoxylated triethanolamine, and at least one alkoxylated ethylenediamine. In addition, the polymer casting formulation can comprise castor oil to improve miscibility with the polyisocyanate component. The polymer casting formulation can also comprise an alkoxylated neutral sucrose/glycerin polyol to increase hardness. The casting formulation can also comprise an aromatic diamine to speed reaction with the polyisocyanates and decrease the susceptibility of harm to the reaction by moisture gain. Glycerine may optionally be added to the formulation to increase dimensional stability.

In an embodiment, the polymer casting formulation can have an isocyanate-reactive component which comprises a first alkoxylated glycerol, a second alkoxylated glycerol, an alkoxylated triethanolamine, an alkoxylated ethylenediamine, castor oil, an alkoxylated neutral sucrose/glycerin polyol, an aromatic diamine, and glycerine. The polymer casting formulation can also have an isocyanate-reactive component which comprises between about 25% and about 35% of a first alkoxylated glycerol having a functionality of about 3, between about 15% and about 25% of a second alkoxylated glycerol having a functionality of about 3, between about 5% and about 10% of an alkoxylated triethanolamine having a functionality of about 3, between about 12% and about 22% of an alkoxylated ethylenediamine having a functionality of about 4, between about 8% and about 15% of castor oil having a functionality of about 3, between about 5% and about 10% of an alkoxylated neutral sucrose/glycerin polyol having a functionality of about 4.6, between about 5% and about 10% of an aromatic diamine, and with the balance being glycerine, all in percent by weight.

In another embodiment, the polyisocyanate component comprises two different polymeric methylenediphenyidiisocyanates which are copolymers of 2,4-MDI and 4,4-MDI, wherein the polyisocyanate component comprises about 55% of the polymeric methylenediphenyldiisocyanate having a higher ratio of 4,4-MDI-to-2,4-MDI and a functionality of about 2.8, and about 30% of the polymeric methylenediphenyldiisocyanate having a lower ratio of 4,4-MDI-to-2,4-MDI and a functionality of about 2.5, and with about 15% of a polymeric pre-polymer mixing agent, and wherein the isocyanate-reactive component comprises about 27% of a first alkoxylated glycerol having a functionality of about 3, about 20% of a second alkoxylated glycerol having a functionality of about 3, about 8% of an alkoxylated triethanolamine having a functionality of about 3, about 17% of an alkoxylated ethylenediamine having a functionality of about 4, about 11% of castor oil having a functionality of about 3, about 7% of an alkoxylated neutral sucrose/glycerin polyol having a functionality of about 4.6, about 7% of an aromatic diamine, and about 3% glycerine, all in percent by weight.

The isocyanate-reactive component may additionally contain a thixotropic agent in an effective amount. A thixotropic agent is a material that imparts shear-sensitive viscosity such that the component containing the thixotropic agent exhibits a lower viscosity when under shear than it exhibits under low shear conditions. Use of a thixotropic agent permits the isocyanate-reactive component to be more easily blended with the polyisocyanate component despite the relatively high viscosities of each. Once the reaction mixture is dispensed and is no longer subject to shearing forces, it reassumes a high viscosity, thus reducing the amount of flow from the area and through holes or poorly sealed seams. Suitable thixotropic agents may include fumed silica and certain clays such as bentonite clay and montmorillonite clay. The thixotropic agent may range, for example, about 0.5 to about 5, preferably from about 1 to about 3 percent of the total weight of isocyanate-reactive component.

In one embodiment, the polymer may comprise syntactic polyurethane. In alternate embodiments, other types of syntactic polymers such as syntactic epoxy and the like may be used. The use of syntactic polymer formulations provides for the production of structural members that are characterized by improved resistance to moisture induced swelling and shrinkage. For example, syntactic polyurethanes may provide for increased water-resistance due to the closed-cell nature of the formulation. Thus, the structural members of the present invention may further comprise substantially less moisture-induced shrinkage and swelling than wood-based frame members. In one embodiment, the frame members of the present invention are substantially impervious to water. Thus, upon being immersed in warm water for extended periods of time the structural members may show no measurable swelling.

To prepare syntactic polyurethane suitable for the structural members of the present invention, methods for producing syntactic urethane known in the art may be employed (see e.g., U.S. Pat. Nos. 5,422,380 and 6,541,534, which are incorporated by reference herein in their entireties). In an embodiment, the syntactic polyurethane may be synthesized as a three-dimensional matrix. To facilitate formation of a three dimensional matrix, isocyanates or isocyanate-reactive compounds having a functionality of more than two may be used as is known in the art. Generation of syntactic polyurethane is also facilitated by reacting a high-viscosity polyisocyanate with a high viscosity isocyanate-reactive component. This may be facilitated by using components having a Brookfield viscosity of from about 50,000 cps to about 400,000 cps (see e.g., U.S. Pat. No. 6,541,534). In an embodiment, the isocyanate and the isocyanate reactive component have similar viscosities. In an embodiment, glass microspheres and/or a thixotropic agent are used to control viscosity. Also, other additives such as, but not limited to, surfactants, colorants, catalysts, and blowing agents may be used.

In an embodiment comprising syntactic polyurethane, the components used to make the polyurethane may comprise a filler. In an embodiment, at least one of the components used to make the urethane may contain microspheres. Either unexpanded microspheres, which are subsequently expanded during processing, or pre-expanded spheres may be used. Unexpanded microspheres have the advantage of greater ease of incorporating the spheres into the matrix resin. Pre-expanded microspheres may provide for more precise control of the ultimate density of the syntactic polyurethane.

Polystyrene microspheres can be used for the syntactic polyurethane and they may be hollow or gas-filled, as a means to create voids within a polymer matrix. The hollow microspheres may be prepared by any of a number of known processes (see e.g., U.S. Pat. No. 5,422,380 and references cited therein).

Suitable microspheres may include those made from inorganic materials such as glass and silica-alumina ceramics, or polymeric materials such as epoxy resin, unsaturated polyester resin, silicone resin, phenolics, polyvinyl alcohol, polyvinyl chloride, polypropylene, and polystyrene. The microspheres may have average diameters of from about 5 to about 150 microns, or from about 20 to about 85 microns. The microspheres should be able to withstand the forces imposed upon them during the formulation, mixing, and dispensing. For example, the microspheres may be selected to have an 80% greater survival rate when exposed to at least 750 psi, or even up to 5000 psi.

To increase the strength of the structural member, the member may further comprise a fiber-reinforced polymer. The fiber used in the member may comprise a polypropylene fiber or other fibers known in the art. Alternatively and/or additionally, glass fiber may be used. The fibers may range in size from about 0.75 inch (19 mm) to about 120 inches (3,048 mm) in length. In other embodiments, the fibers may range in size from about 0.75 inch (19 mm) to about 10 inches (254 mm) in length. In one example embodiment of a door jamb made by the method of the present invention, the fibers may range from about 0.75 inch (19 mm) to about 3 inches (76.2 mm) in length. Alternatively and/or additionally, microspheres may be used as filler or for reinforcement. In other embodiments, glass flakes, minerals, or wood fibers may be used as filler or reinforcing material. In an embodiment, the structural member may comprise a tensile strength and density to support the weight of a panel that is attached to the frame. In an embodiment, the filler ranges from 0.1 to 90% by weight of the composite. In alternate embodiments, the amount of filler used may range from 1 to 50% by weight, or from 5 to 20% by weight.

The polymerization reaction between the polyisocyanate component and the isocyanate-reactive component can be catalyzed by the inclusion of one or more catalysts in either one of, or in each of the reactive components. Any of a number of catalysts customarily used to form polyurethane may be used in the present method. Suitable examples include tertiary amines and/or organometallic compounds. Examples of compounds which may be used as catalysts include the following: triethylenediamine, aminoalkyl- and/or aminophenyl-imidazoles, e.g. 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole, 1-(3-aminopropyl)imidazole and/or 1-(3-aminopropyl)-2-methylimidazole, tin(II) salts of organic carboxylic acids, examples being tin(II)diacetate, tin(II) dioctoate, tin(II) diethylhexoate, 1,4-diazol-bicylclo[2,2,2]-octane, iron(III)acetylacetonate, and tin(II)dilaurate, and dialkyltin(IV) salts of organic carboxylic acids, examples being dibutyltin diacetate, dibutyltin dilaurate, dibutyltin maleate, organic salts of bismuth, mercury and zinc, and dioctyltin diacetate.

Either or both of the polyisocyanate component and the isocyanate-reactive component optionally includes additional components, such as release agents, blowing agents, pigments, surface-active compounds and/or stabilizers to counter oxidative, thermal or microbial degradation or aging.

The polyurethane of the present method may be made by a one-step process or a two-step process. The one-step process may entail mixing together all of the raw material ingredients without any pre-reaction, such that the polyisocyanate reacts with the isocyanate-reactive compound(s) to form a polyurethane polymer. The matrix polymer may also contain a combination of urethane and urea linkages. Any required additives may be premixed with each other and/or with the reactive components or added when the reactive components are being combined. Reactive components having the same type of reactive group, for example two different polyols, may be premixed in the isocyanate-reactive component prior to being brought into contact with the polyisocyanate component. After the reactive components are brought together, the polymerization reaction commences and the liquid reactant mixture forms a solid polymer. If a syntactic formulation is to be made, hollow polymeric or glass microspheres become embedded in the solid polymer.

In contrast, a two-step method may entail first preparing a polyurethane prepolymer by reacting an excess of a polyisocyanate, usually a diisocyanate, with a isocyanate-reactive compound. All or a portion of the additives such as polymeric microvoids, flame retardants, pigments, and the like, may then be added to the prepolymer along with a chain extender such as a low molecular weight polyol or a polyamine. If a catalyst is used, the catalyst may either be added to the prepolymer or to the chain extender component. Also, if microspheres are used, all or a portion of the microspheres may be added to either the prepolymer or the chain extender. The chain extender and prepolymer may then be mixed and the mixture poured into a mold and cured.

The methods of the present invention may be applied using manufacturing protocols and equipment that are already available in the art. In one embodiment, a polyisocyanate component is intermixed with an isocyanate-reactive component and the temperature of the liquid mixture that results is preferably brought to about 75° F. (24° C.) to about 80° F. (27° C.) prior to being introduced into a mold. It is preferred that the mold is at about room temperature when the casting formulation is added. The reactive components react in a polymerization reaction to form a polyurethane polymer. In one embodiment, the reaction is exothermic. When the molded piece cools to the point where it can be handled, it can be removed from the mold and either used directly or further prepared for use.

Figure 4:
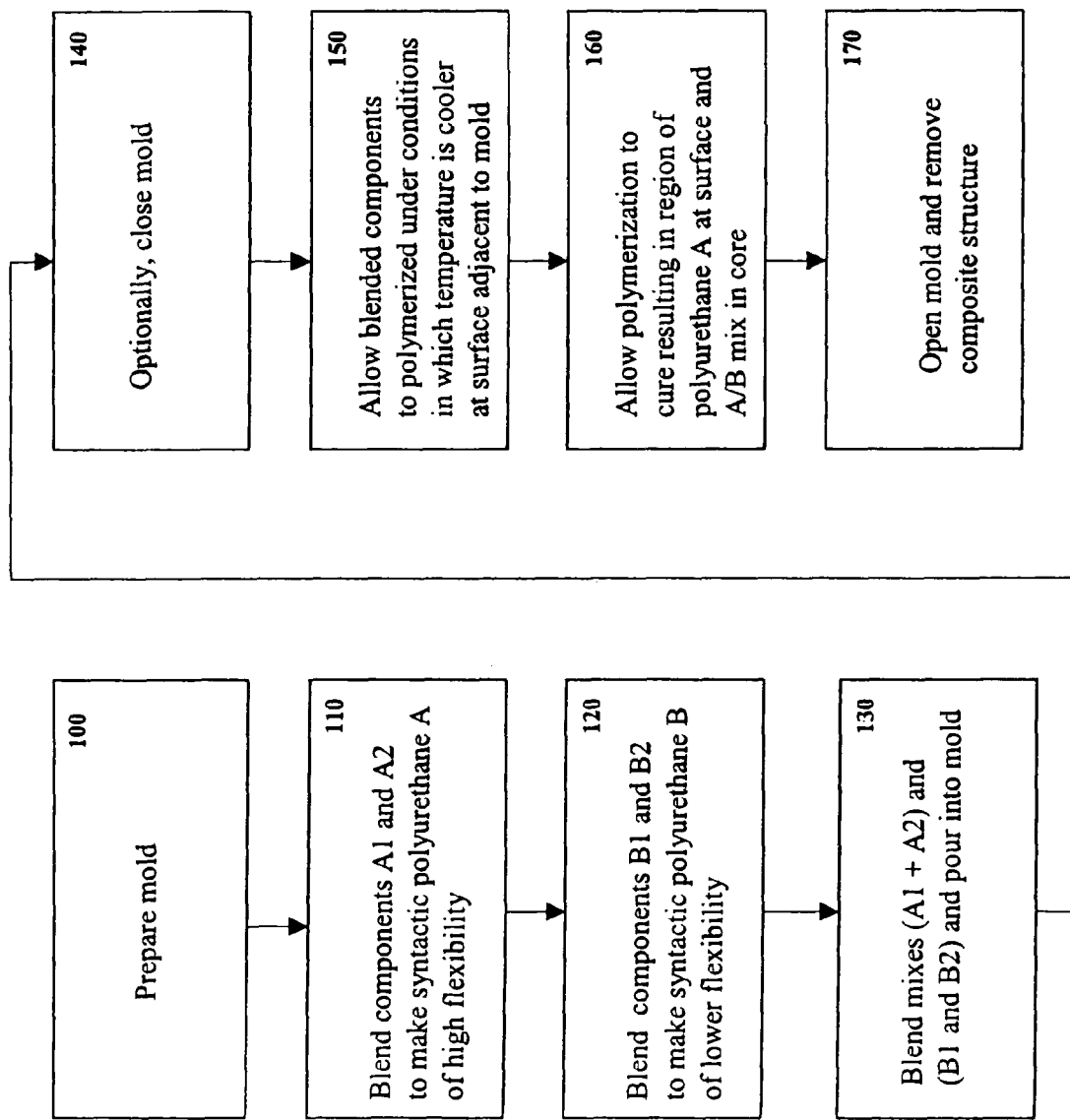
FIG. 4 illustrates a method for making polymer blend composite structures in accordance with an example embodiment of the present invention.

An alternative method to prepare the present structural members is outlined in FIG. 4. As shown in FIG. 4, a first step may entail preparing a mold comprising an internal volume having the shape of the composite structure to be made 100. Next, components to make a first polymer (polymer A) are blended 110. At the same time, or soon after mixing the components, for polymer A, the components to form a second polymer (polymer B) may be mixed 120. For example, where the polymer blend comprises syntactic polyurethane, the components used to make polymer A may comprise an isocyanate (A1) and an isocyanate-reactive compound (A2). Similarly, the components used to make the second polymer may comprise an isocyanate (B1)(either the same or different A1) and an isocyanate-reactive compound (B1)(either the same or different than A1). Although many of the components used to make polymer A and polymer B may be similar or the same, there will be at least one component in the mixture that will differ between the two polymers. Also, as the structural composites of the present invention are suitable for use in building structures, the polymer blend may comprise an internal colorant to give the composite color.

Next, the preblended components (A1/A2 and B1/B2) may be mixed, and the mixture poured into the mold 130. The mold may then be closed 140. In another embodiment, an open mold may be used. The polymerization is then allowed to proceed in the mold under conditions such that at portion of the blend polymerizes under different conditions than the remainder of the blend 150. In one embodiment, polymerization is exothermic and the mold comprises a surface that is cooler than the temperature of the polymerization reaction. In this way, the surface of the mold can modify the polymerization reaction such that the polymer formed at the surface of the mold has different properties from the polyurethane in the core region. In one embodiment, the mold may comprise fluting or other decorative shaping. Where such additional shaping is included, the polymer layer at the surface will include the additional shaping.

In an embodiment, the structural member is allowed to remain in the mold until polymerization is substantially complete. Alternatively, the part may be removed at or shortly after peak exotherm, and formed to a different shape (i.e., such as an arch shape or the like).

The maximum temperature reached during polymerization may range from about 130° F. (54.4° C.) to about 300° F. (149° C.), or from about 180° F. (82.2° C.) to about 260° F. (126.7° C.). Once polymerization is complete and the polymers have cured 160, the mold may be opened and the frame member removed 170. At this point, the member may be further machined as for example, to add hinges, lock fixtures, and/or weather stripping.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

Example 1

This illustrates the production of an embodiment of a polymer casting formulation of the present invention.

The polymer casting formulation comprises a polyisocyanate component and an isocyanate-reactive component, which are blended in a 1:1 weight/weight ratio just prior to filling a mold.

| Ingredient | Amount (pph) |
|---|---|
| POLYISOCYANATE COMPONENT: | |
| Polymeric blend of 2,4-MDI and 4,4'-MDI (functionality = 2.8, viscosity = 180 cps @ 25° C.) | 55 |
| Polymeric blend of 2,4-MDI and 4,4'-MDI (functionality = 2.5, viscosity = 80 cps @ 25° C.) | 30 |
| Polymeric prepolymer miscibility aid | 15 |
| Total | 100 |
| ISOCYANATE-REACTIVE COMPONENT | |
| Propoxylated glycerol (hydroxyl no. = 168, functionality = 3.0, viscosity = 260 cps @ 25° C.) | 27 |
| Ethoxylated/propoxylated glycerol (hydroxyl no. = 28, functionality = 3.0, viscosity = 1150 cps @ 25° C.) | 20 |
| Propoxylated triethanolamine (Hydroxyl no. = 600, functionality = 3.0, viscosity = 380 cps @25° C.) | 8 |
| Propoxylated ethylene diamine (Hydroxyl no. = 770, functionality = 4.0, viscosity = 50,000 cps @ 25° C.) | 17 |
| Super refined castor oil (Hydroxyl no. = 164, functionality = 3.0, viscosity = 7.3 stokes @ 25° C.) | 11 |
| Prooxylated neutral sucrose/glycerin polyol (Hydroxyl no. = 376, functionality = 4.6, viscosity = 2750 cps @ 25° C.) | 7 |
| Aromatic diamine (secondary), (MW = 200, EW = 110, Viscosity = 39 @ 15.5° C.) | |
| Glycerine | 3 |
| Total | 100.00. |

Polymeric polyisocyanates are available from Huntsman Corp., The Woodlands, Tex. PP-205 is an isocyanate prepolymer of Rubinate® 1820 and Poly G 20-56 and is available from HiTherm, LLC, Ceritos, Calif.

Propoxylated glycerol is available as Poly G 30-168, Ethoxylate/propoxylated glycerol is available as Poly G 85-29, Propoxylated triethanolamine is available as Poly 37-600, Propoxylated ethylene diamine is available as Poly G 40-770, and Propoxylated neutral sucrose/glycerin polyol is available as Poly G 74-376, all from Arch Chemicals, Inc., Norwalk, Conn. Super-refined Castor Oil is available as DB Oil from Cas-Chem. A secondary aromatic diamine is available as Polylink 4004 from The Hanson Group. Glycerine is supplied by Ashland Distribution.

The casting formulation is intermixed immediately prior to filling the mold and is cooled to between 75° F. (24° C.) and 80° F. (27° C.) for mold filling. The mold is at room temperature. The mold is a silicon mold through which heat can escape during the exothermic reaction, providing cooler reaction conditions at the interface between the mold and the contents. A surface region and a core region are formed on the cured structural member.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions by those of ordinary skill in the art without departing from the scope of the invention, it is intended that all matter contained in the above description shall be interpreted as illustrative and not in a limiting sense. In addition it should be understood that aspects of the various embodiments may be interchanged both in whole or in part.

It is contemplated and within the scope of the invention that when a range is recited any number (integer or non-integer) that falls within that range is contemplated as being an endpoint of a range to generate any subgenus (for example, if a given range is recited as being 1 to 5, it is contemplated and within the scope of the invention that a subgenus of 1.62 to 3.87 is contemplated as being within the scope of the invention). It is therefore within the spirit and scope of the invention that such modifications as are recognized by those of skill in the art be covered by the instant invention.

What is claimed is:

1. A molded polymeric structural member comprising:
a single piece of polyurethane elastomer having a surface region and a core region, the surface region having a hardness that is less than a hardness of the core region, wherein the polyurethane elastomer is shaped and dimensioned as a building structure and is capable of being used as a load bearing member,
wherein the polyurethane elastomer is formed from a combination of a polyisocyanate component and an isocyanate-reactive component,
wherein the polyisocyanate component comprises at least one polymeric diisocyanate, and
wherein the isocyanate-reactive component comprises between about 25% and about 35% of a first alkoxylated glycerol, between about 15% and about 25% of a second alkoxylated glycerol, wherein the first and second alkoxylated glycerols are different, between about 5% and about 10% of an alkoxylated triethanolamine, between about 12% and about 22% of an alkoxylated ethylenediamine, between about 8% and about 15% of castor oil, between about 5% and about 10% of an alkoxylated sucrose/glycerin polyol, between about 5% and about 10% of an aromatic diamine, all in percent of the isocyanate-reactive component by weight.

2. The structural member of claim 1, which has been produced by a method that comprises:
intermixing a polyisocyanate component comprising at least two polyisocyanates with an isocyanate-reactive component to form a liquid casting formulation;
wherein the isocyanate-reactive component comprises between about 25% and about 35% of a first alkoxylated glycerol, between about 15% and about 25% of a second alkoxylated glycerol, wherein the first and second alkoxylated glycerols are different, between about 5% and about 10% of an alkoxylated triethanolamine, between about 12% and about 22% of an alkoxylated ethylenediamine, between about 8% and about 15% of castor oil, between about 5% and about 10% of an alkoxylated sucrose/glycerin polyol, between about 5% and about 10% of an aromatic diamine, all in percent of the isocyanate-reactive component by weight;
introducing the liquid casting formulation into a mold having a negative form of the structural member;
allowing the polyisocyanate to react with the isocyanate-reactive compound to form a solid polyurethane polymer in the shape of the structural member; and
removing the structural member from the mold.

3. The structural member of claim 2,
wherein the polyisocyanate component comprises two different polymeric methylenediphenyldiisocyanates which are copolymers of 2,4-MDI and 4,4-MDI,
wherein the polyisocyanate component comprises between about 45% to about 65% of a polymeric methylenediphenyldiisocyanate having a first ratio of 4,4-MDI to 2,4-MDI and a functionality of about 2.8, and between about 20% to about 40% of a polymeric methylenediphenyldiisocyanate having a second ratio of 4,4-MDI to 2,4-MDI and a functionality of about 2.5, wherein the first ratio is higher than the second ratio, and between 0% and about 35% of polymeric pre-polymer mixing agent, all in percent of the polyisocyanate component by weight, and wherein the isocyanate-reactive component comprises between about 25% and about 35% of a first alkoxylated glycerol having a functionality of about 3, between about 15% and about 25% of a second alkoxylated glycerol having a functionality of about 3, wherein the first and second alkoxylated glycerols are different, between about 5% and about 10% of an alkoxylated triethanolamine having a functionality of about 3, between about 12% and about 22% of an alkoxylated ethylenediamine having a functionality of about 4, between about 8% and about 15% of castor oil having a functionality of about 3, between about 5% and about 10% of an alkoxylated neutral sucrose/glycerin polyol having a functionality of about 4.6, between about 5% and about 10% of an aromatic diamine, and between 0% and about 25% of glycerine, all in percent of the isocyanate-reactive component by weight.

4. The structural member of claim 1, wherein a modulus of elasticity of the surface region is greater than a modulus of elasticity of the core region.

5. The structural member of claim 1, wherein the polyisocyanate component comprises between about 45% to about 65% of a polymeric methylenediphenyldiisocyanate having a first ratio of 4,4-MDI to 2,4-MDI, and between about 20% to about 40% of a polymeric methylenediphenyldiisocyanate having a second ratio of 4,4-MDI to 2,4-MDI, wherein the first ratio is higher than the second ratio, and between 0% and about 35% of a polymeric pre-polymer mixing agent, all in percent of the polyisocyanate component by weight.

6. The structural member of claim 1, wherein the single piece of polyurethane is formed from a combination of a polyisocyanate component that comprises two different polymeric methylenediphenyldiisocyanates which are copolymers of 2,4-MDI and 4,4-MDI, and an isocyanate-reactive component, wherein the polyisocyanate component comprises between about 45% to about 65% of a polymeric methylenediphenyldiisocyanate having a first ratio of 4,4-MDI to 2,4-MDI, and between about 20% to about 40% of a polymeric methylenediphenyldiisocyanate having a second ratio of 4,4-MDI to 2,4-MDI, wherein the first ratio is higher than the second ratio, and between 0% and about 35% of a polymeric pre-polymer mixing agent, all in percent of the polyisocyanate component by weight.

7. The structural member of claim 1, wherein the single piece of polyurethane is shaped as a door frame member.

8. The structural member of claim 7, wherein the single piece of polyurethane is shaped as a vertical door jamb.

9. The structural member of claim 7, wherein the single piece of polyurethane is shaped as a header jamb.

10. The structural member of claim 7, wherein the single piece of polyurethane is shaped as a door sill.

11. The structural member of claim 1, wherein the single piece of polyurethane is shaped as a window frame member.

12. The structural member of claim 1, wherein the single piece of polyurethane is shaped as a lineal molding.

13. The structural member of claim 1, wherein the single piece of polyurethane is shaped as an astragal.

14. The structural member of claim 1, wherein the single piece of polyurethane defines a first face that is configured to be adjacent to a building structure when the structural member is fixed to the building structure, and defines at least two additional faces that extend away from the first face, and wherein the two additional faces are included in the surface region of the single piece of polyurethane.

15. The structural member of claim 14, wherein at least a portion of the first face is included in the surface region.

16. The structural member of claim 14, wherein a portion of the first face is included in the core region.

17. The structural member of claim 14, wherein the at least two additional faces that extend away from the first face are parallel to each other and perpendicular to the first face.

18. The structural member of claim 14, wherein the first face is planar.

19. The structural member of claim 1, wherein the polyisocyanate component comprises two different polymeric methylenediphenyldiisocyanates which are copolymers of 2,4-MDI and 4,4-MDI, wherein the polyisocyanate component comprises between about 45% to about 65% of a polymeric methylenediphenyldiisocyanate having a first ratio of 4,4-MDI to 2,4-MDI and a functionality of about 2.8, and between about 20% to about 40% of a polymeric methylenediphenyldiisocyanate having a second ratio of 4,4-MDI to 2,4-MDI and a functionality of about 2.5, wherein the first ratio is higher than the second ratio, and between 0% and about 35% of a polymeric pre-polymer mixing agent, all in percent of the polyisocyanate component by weight, and wherein the isocyanate-reactive component comprises between about 25% and about 35% of a first alkoxylated glycerol having a functionality of about 3, between about 15% and about 25% of a second alkoxylated glycerol having a functionality of about 3, wherein the first and second alkoxylated glycerols are different, between about 5% and about 10% of an alkoxylated triethanolamine having a functionality of about 3, between about 12% and about 22% of an alkoxylated ethylenediamine having a functionality of about 4, between about 8% and about 15% of castor oil having a functionality of about 3, between about 5% and about 10% of an alkoxylated neutral sucrose/glycerin polyol having a functionality of about 4.6, between about 5% and about 10% of an aromatic diamine, and between 0% and about 25% of glycerine, all in percent of the isocyanate-reactive component by weight.

20. The structural member of claim 1, wherein the at least one polymeric diisocyanate comprises at least one polymeric methylenediphenyldiisocyanate.

21. The structural member of claim 1, wherein the at least one polymeric diisocyanate comprises two different methylenediphenyldiisocyanates.

22. The structural member of claim 1, wherein the isocyanate-reactive component further comprises glycerine, wherein the glycerine constitutes between 0% and about 25% percent by weight of the isocyanate-reactive component.

23. The structural member of claim 22, wherein the glycerine constitutes about 3% by weight of the isocyanate-reactive component.

24. The structural member of claim 1, wherein the single piece of polyurethane elastomer has a modulus of rupture that is within a range of from about 5,000 psi to about 15,000 psi.

25. The structural member of claim 24, wherein the surface region of the single piece of solid polyurethane elastomer has a modulus of elasticity that is within a range of from about 200,000 psi to about 500,000 psi.

26. The structural member of claim 1, wherein the surface region of the single piece of polyurethane elastomer has a modulus of elasticity that is within a range of from about 200,000 psi to about 500,000 psi.

27. The structural member of claim 1, further comprising a filler.

28. The structural member of claim 27, wherein the filler comprises one or more of microspheres and fibers.

29. The structural member of claim 19, wherein the polymeric pre-polymer mixing agent constitutes about 15% percent by weight of the polyisocyanate component.

30. The structural member of claim 19, wherein the glycerine constitutes about 3% percent by weight of the isocyanate-reactive component.

\* \* \* \* \*